United States Patent [19]

Leigh

[11] Patent Number: 4,986,464
[45] Date of Patent: Jan. 22, 1991

[54] FOLDABLE MEASURING DEVICE

[75] Inventor: Joanne K. Leigh, Wilmington, Del.

[73] Assignee: E. I. du Pont de Nemours and Company, Wilmington, Del.

[21] Appl. No.: 327,948

[22] Filed: Mar. 23, 1989

[51] Int. Cl.$^5$ .................... G01F 19/00; B65D 5/42
[52] U.S. Cl. .................... 229/116; 73/426; 206/459
[58] Field of Search .................... 73/426; 229/116, 162, 229/121

[56] References Cited

U.S. PATENT DOCUMENTS

| | | | |
|---|---|---|---|
| 1,597,757 | 8/1926 | Berger | 229/116 X |
| 3,690,523 | 9/1972 | Link | 229/162 X |
| 4,320,830 | 3/1982 | Roccaforte | 229/162 X |
| 4,339,067 | 7/1982 | Bessey | 229/162 X |
| 4,798,747 | 1/1989 | Laramee | 229/116 |

FOREIGN PATENT DOCUMENTS

| | | | |
|---|---|---|---|
| 2302660 | 9/1973 | Fed. Rep. of Germany | 229/116 |
| 0993163 | 10/1951 | France | 73/426 |
| 0305518 | 2/1929 | United Kingdom | 229/116 |

*Primary Examiner*—Daniel M. Yasich
*Attorney, Agent, or Firm*—James A. Costello

[57] ABSTRACT

A measuring device constructed from cellulosic material such as heavy paper or paperboard, metal, or a polymeric material, the material of construction having a predetermined geometric shape with creases segmenting the shaped material to facilitate folding, unfolding and refolding the device, the device being calibrated and useful for measuring particulate materials.

19 Claims, 5 Drawing Sheets

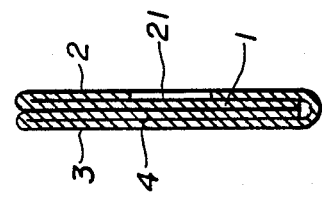
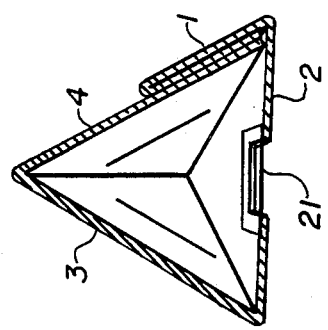
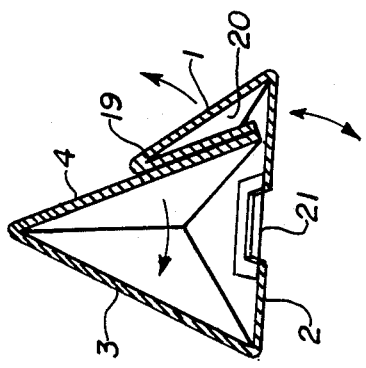
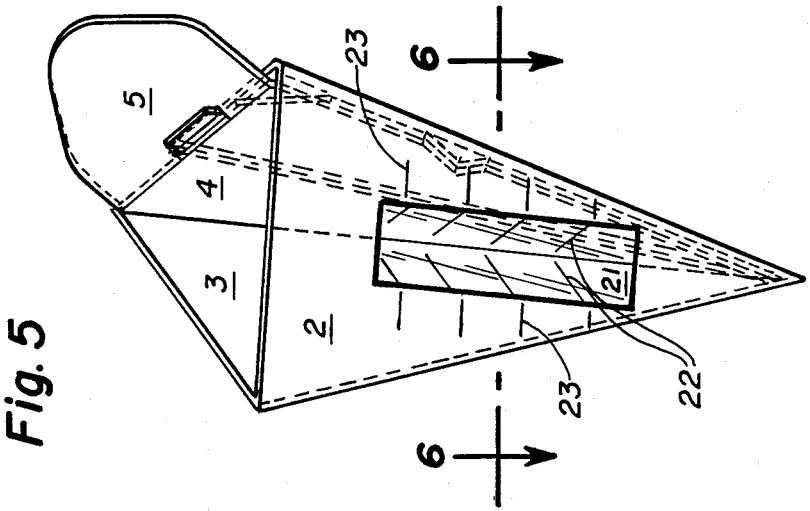

4,986,464

FOLDABLE MEASURING DEVICE

BACKGROUND OF THE INVENTION

This invention pertains to a device for measuring and dispensing particulate materials. The device is designed to lie substantially flat before its first use, to fold quickly for use in measuring, and to unfold and lie substantially flat between uses. The device can be calibrated depending on the volume and/or the density of the particulate material being measured and dispensed.

The ease of fabrication of this device will recommend it for many uses in which one needs to measure and dispense particulate materials. A specific contemplated use is for measuring and dispensing active ingredients under field conditions. The device can be employed by farmers and other workers who need to add specific amounts of an active ingredient such as a pesticide, e.g., a herbicide, insecticide, fungicide, and the like, or a fertilizer, to water preparatory to spraying fields, crops, and other vegetation. The device is easy to store and carry when not in use. It is readily folded and refolded for repeated use in the field. It eliminates the need for bulky equipment such as scales for weighing the active ingredient particulates.

The device can also be used to measure other types of particulates from foodstuffs to minerals. The devices are sift-proof for accurate measurement of any powder, particulate or granular materials. The incremental graduation of the device can be in units of weight or volume or both. For instance, the outside can be graduated in terms of weight for a specific particulate whose density is known while the inside (viewable through a window) can be graduated by volume, or vice versa.

SUMMARY OF THE INVENTION

This invention pertains to a foldable measuring device in both its folded and unfolded condition. The device, useful for measuring particulate materials, comprises:

(i) a substantially flat member having first, second, third and fourth substantially triangular sections, each section having first, second and third edges, the first and second edges of each of the sections being substantially the same length, the first section second edge being connected at a first crease along the second section first edge, the second section second edge being connected at a second crease along the third section first edge, the third section second edge being connected at a third crease along the fourth section first edge;

(ii) an optional tab connected to the first section third edge; and (iii) an optional fifth section having an edge connected at a fourth crease along the fourth section third edge, the fourth crease having a slot for receiving the tab when the device is folded at the first, second and third creases, the device having an inside and an outside, the inside being the side next to the particulates to be measured and the outside forming the outer surface of the device, when folded for measuring, the device is substantially symmetrical about an axis with the first section being in contact with the fourth section.

A contemplated device is one in which one or more of the first through fourth sections has a window permitting a view through the section to determine the quantity of material in the device. A contemplated device is one in which the outer surface of one or more of the first through fourth sections has visible graduations to indicate incremental quantities of the material held within the device. A contemplated device is one in which the inner surface of one or more of the first through fourth sections has visible graduations to indicate incremental quantities of the material held within the device. A contemplated device is one in which optional elements (ii) and (iii) are present and in which the first section has an easily creasable line dividing the first section into a first segment and a second segment, the tab being on the second segment such that the first segment can be folded with respect to the second segment about the creasable line with the first segment between the fourth section and the second segment when the tab is in the slot. A contemplated device is one in which one or both of the first edge of the first section and the second edge of the fourth section have a cut out portion to facilitate folding of the device to a substantially flat position with the first section inside surface in contact with the second section inside surface, the third section inside surface in contact with the fourth section inside surface and the first section outer surface in contact with the fourth section outer surface.

An alternative configuration is one comprising the four sections described in item (i) without the tab of item (ii) and without the fifth section of item (iii). In this configuration, the four sections are joined so that the first edge of the first section is adhered about the outside of the second edge of the third section. When folded for measuring, the fourth section can be rotated so that it is in contact with the inner surface of the first section to define a three-sided measuring device that does not require a tab and slot arrangement to maintain rigidity. When folded flat, the device will fold along the creasable line of the first section and the crease between the second and third sections. In one such embodiment, the first segment of the first section will be in contact with the fourth section and the second segment of the first section will be in contact with the second section, i.e., the first and second outside segments of the first section will be in contact with one another. In an alternative embodiment, one which will give a larger outside area to the folded device, the first and second inside segments of the first section are in contact with one another.

BRIEF DESCRIPTION OF THE DRAWINGS

In FIG. 3 there is no fold along the creasable line between the first and second segments of the first section. In FIG. 3A there is a fold and the first segment of the first section is adhered to the outside of the fourth section so that the tab of the first section lines up with the slot between, the fourth and fifth sections.

FIG. 5 depicts an assembled device having a window for viewing the contents.

FIG. 6 depicts a cross-section through line 6—6 of FIG. 5.

FIG. 6A depicts an intermediate position of the device between the assembled device of FIG. 5 ready for measuring and the device as depicted in FIG. 7.

FIG. 7 depicts the device of FIG. 5 unfolded and lying flat.

DETAILS OF THE INVENTION

The materials of construction can be selected from a wide range of cellulosics, polymers and metals. Cellulosics include solid fiber paperboard or corrugated fiberboard. Contemplated polymers include polyolefins, preferably polypropylene. Any metal can be employed which has the desired physical properties. Thicknesses of materials will vary depending on the materials of construction and the size of the measuring device. For example, typical thicknesses for paperboard are about 0.016 to 0.032 inch. Corrugated fiberboard can be up to 0.25 inch in thicknesses. Polymers can be in the range of about 0.016 to 0.25 inch. Metals can be about 16 to 24 gauge with some variation above or below those thicknesses being possible depending on the metal employed and the useful life for which the device is being designed.

The thickness of the transparent window will usually range from about ¼ to 4 mils. The window material can be a cellulosic such as cellophane, or a synthetic polymer such as polyethylene terephthalate or polyolefin. The adhesive for the window will typically be a cold, synthetic, resin-based material. The adhesive for the paperboard can be a cold, synthetic; natural resin-based; or thermoplastic polymer. When the sidewall material of construction is a metal, the adhesive will be polymer-based. This discussion of materials of construction, thicknesses, adhesives, and the like, will suggest starting points for one skilled in the art who will be able, easily and without undue experimentation, to construct devices from a variety of materials having a broad range of sizes.

As employed herein, the term "particulate(s)" includes any material(s) in the form of a particle, powder, granule or any other geometrical shape of appropriate size.

Figure 1:
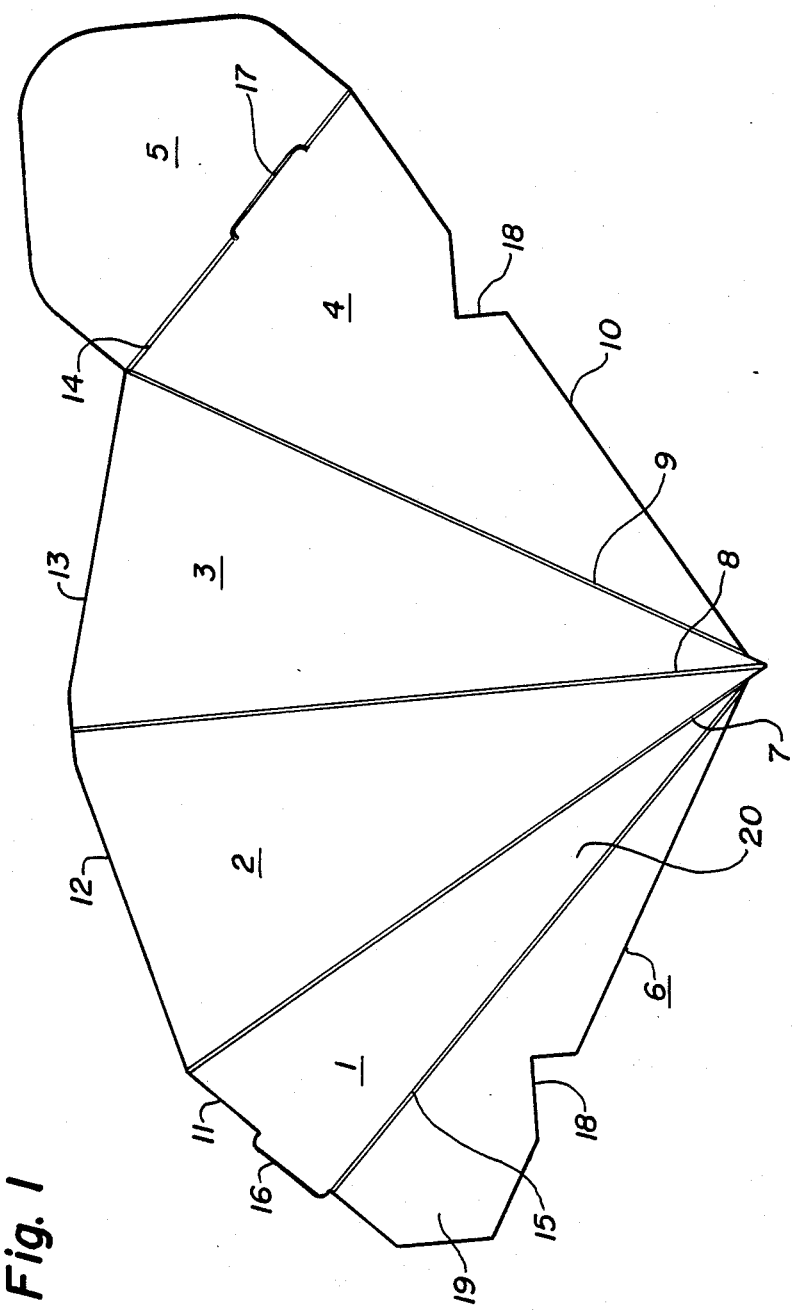
FIG. 1 is a drawing of a paperboard blank showing sections, creases, slot and tab.

In FIG. 1, the first section 1 has edges 6, 7 and 11. The second section, 2, has edges 7, 8 and 12. The third section, 3, has edges 8, 9, and 13. The fourth section, 4, has edges 9 and 10. Section 1 has a crease or perforated line 15 which divides that section into segments 19 and 20. Tab 16 in segment 20 of section 1 is designed to fit into slot 17 in crease 14 between sections 4 and 5 when the device is folded for measuring. Cutouts 18 are optional and are depicted as positioned along edges 6 and 10. One or both of said cutouts can be eliminated if desired. In FIG. 1, numerals 7, 8 and 9 depict the common edge between sections 1-2, 2-3, and 3-4, respectively.

Figure 2:
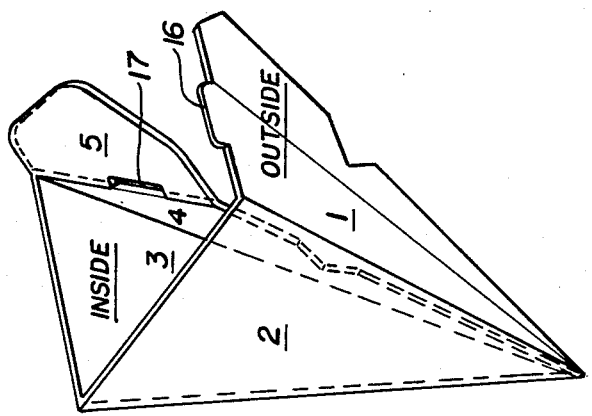
FIG. 2 depicts an interim position in folding to form the measuring device.

FIG. 2 depicts the device of FIG. 1 partially folded to form a measuring device. The device is being folded so that the first section will contact the fourth section with tab 16 fitting into slot 17.

Figure 3A:
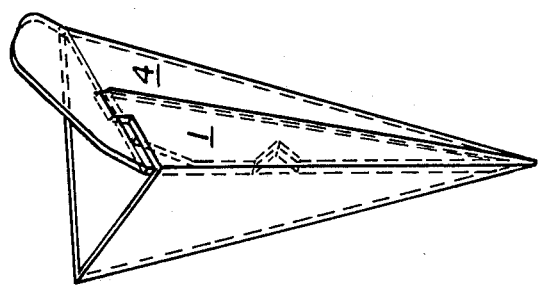
FIGS. 3 and 3A are drawings of a folded measuring device.
Figure 3:
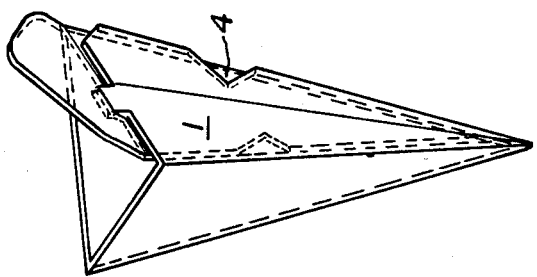

FIG. 3 depicts the device of FIG. 2 completely folded with tab 16 in slot 17 and with the inside of section 1 lying flat against the outside of section 4. In FIG. 3A, segment 19 of section 1 is folded over segment 20 of section 1 and the outside of segment 19 is glued against the outside of section 4 so that the tab can be inserted in the slot. There is good stiffness and structural integrity for the devices depicted in FIGS. 3 and 3A. In these devices, section 5 can be folded down over the tab on the outside of section 1 for an extra measure of stability. Section 5 can be any configuration, it being necessary (for this embodiment) only that it have a sufficient area to define slot 17.

The device of FIG. 3A is unfolded after use by disengaging the tab from the slot and rotating section 4 toward section 3, thereby straightening segments 19 and 20 of section 1 so that they lie flat against section 4.

Figure 4:
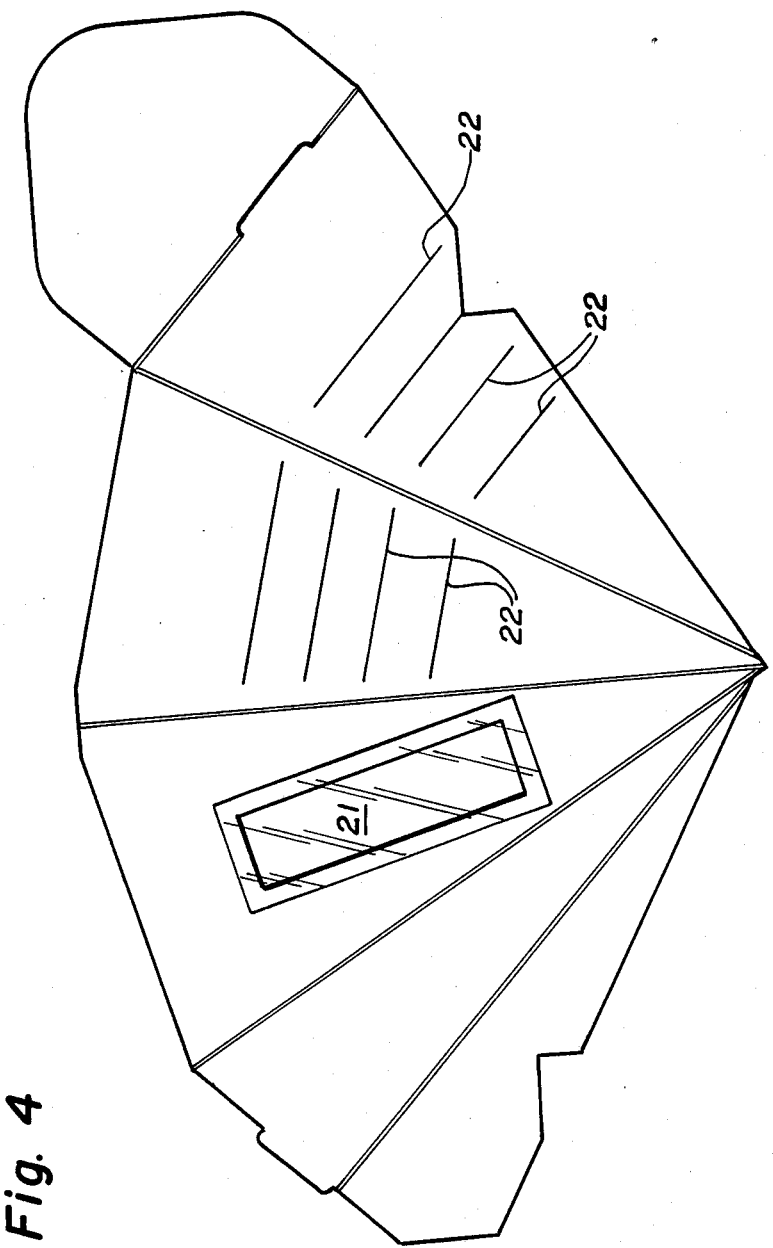
FIG. 4 depicts a paperboard blank with a window cutout.

FIG. 4 depicts a blank with a window 21 and linear representation of measurement gradients, 22, on the inside of the device. The blank is otherwise substantially the same as that depicted in FIG. 1 with the same numerical designations as employed in FIG. 1 for corresponding portions of the device.

FIG. 5 depicts the blank of FIG. 4 folded into a measuring device. The device of FIG. 5 depicts segments 19 and 20 of section 1 being folded over one another with segment 19 (but not 20) being in contact with section 4 when the device is folded open for use. Typically, segment 19 is adhesively affixed to section 4 so that the device can be unfolded to lie flat when section 4 is rotated toward section 3. Inside gradients 22 are visible through window 21. The Figure also depicts outside gradients 23 which may be of the same or different unit progression as the inside gradients.

FIG. 6 taken in cross-section along lines 6—6 of FIG. 5 and FIGS. 6A and 7 show the device of FIG. 5 in various stages of openness from fully open (FIG. 6) to fully closed, FIG. 7. FIG. 6A shows the device partially unfolded with rotation of section 4 toward section 3 and the unbending of segments 19 and 20 toward a position wherein they are in the same plane with all of section 1 lying flat between sections 2 and 4.

Figure 8:
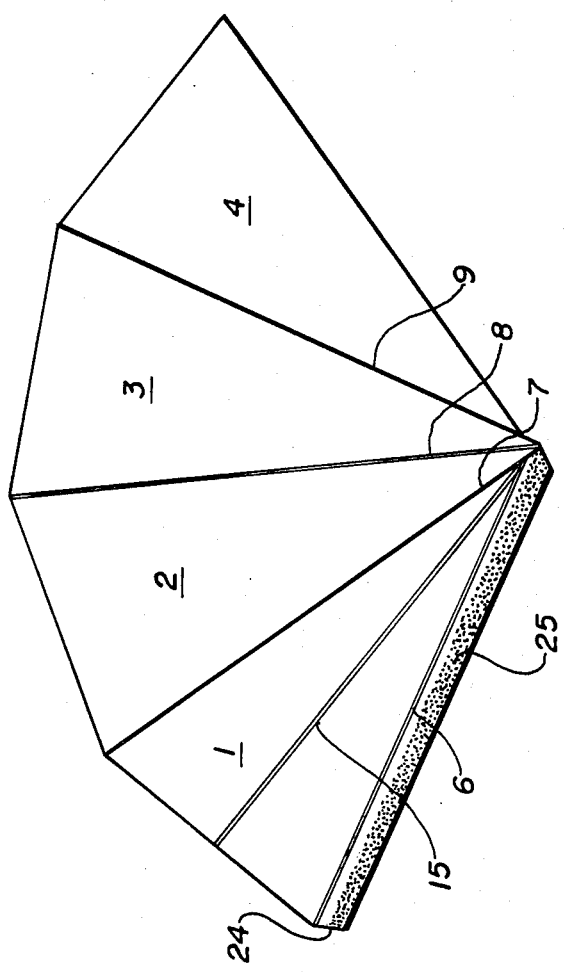
FIG. 8 depicts a drawing of a paperboard blank embodiment that does not utilize the tab-slot arrangement or a fifth section.

FIG. 8 is an embodiment, in blank, without the optional features of tab 16, slot 17, section 5, and cutouts 18. This embodiment has a flap extension 24 on section 1 having adhesive 25 along its inside edge. The flap is designed to wrap around the outside of edge 9 between sections 3 and 4 so that when the device is folded for use, the outside of section 4 will lie against the inside of section 1 to lend rigidity to the device.

Figure 9:
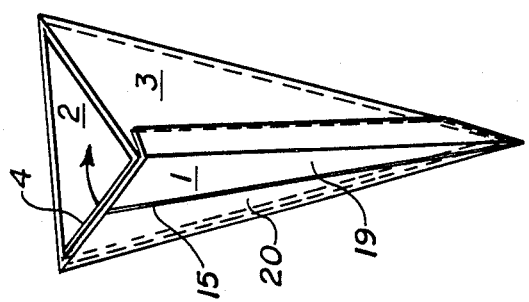
FIG. 9 is a perspective view of the device of FIG. 8 folded for use.

FIG. 9 depicts the device of FIG. 8 folded for use. The flap 24 is glued along the outside of section 3 so that the edge 6 of section 1 lines up with the outside of edge 9 between sections 3 and 4. The device is unfolded to lie flat by rotating section 4 toward section 3 in the direction of the arrow and by folding along creasable line 15 in section 1. Segments 19 and 20 of section 1 can be folded toward each other so that their inner sides are in contact with one another or so that their outer sides are in contact with one another. The fold creating the more compact, flat device is created by having the outside of 19 and 20 in contact.

EXAMPLE

A blank is cut out of 0.024 inch low density bleached sulfate paperboard in the shape and with the creases depicted in FIG. 4. The longest dimension from a point on the first section to a point on the fourth section is about 14-⅜ inches and the length of any first edge is about 8-⅜ inches. The window is cut out of the second section of the creased paperboard. Gradient lines are printed on the inside of the blank so as to be viewable through the window when the device is folded open, and on the outside, in two different increments, ¼ and ⅛ ounce(s). The window material is polyethylene terephthalate which is glued to the inside of the blank so that the window will not leak particulates during use of the device. The blank is folded to form a measuring device as depicted in FIG. 5. This device, when used to measure particulates of the herbicide, bensulfuron methyl, has a volume sufficient to measure 8 ounces of the herbicide with a volumetric accuracy of about 7.5% or better.

In like manner, the device can be constructed of a polymer such as polypropylene, or a metal, one skilled in the art needing only to vary the stamping and cutting tools in a manner that will be obvious given the teaching provided herein.

I claim:

1. A foldable device in both its folded and unfolded condition for measuring quantities of particulate materials when in its folded condition comprising:
   (i) a substantially flat member having first, second, third and fourth substantially triangular sections, each section having first, second and third edges, the first and second edges of each section being substantially the same length, the first section second edge being connected at a first crease along the second section first edge, the second section second edge being connected at a second crease along the third section first edge, the third section second edge being connected at a third crease along the fourth section first edge;
   (ii) an optional tab connected to the first section third edge; and
   (iii) an optional fifth section having an edge connected at a fourth crease along the fourth section third edge, the fourth crease having a slot for receiving the tab when the device is folded at the first, second and third creases,
      the device having an inside and an outside, the inside being the side next to the particulates to be measured and the outside forming the outer surface of the device,
      when folded for measuring, the device is substantially symmetrical about an axis with the first section being in contact with the fourth section,
      wherein the inner surface of one or more of the first through fourth sections has visible graduations to indicate incremental quantities of the material held within the device when folded.

2. A device according to claim 1, wherein one or more of the first through fourth sections has a window permitting a view through the section to determine the quantity of material in the device.

3. A device according to claim 2 constructed of paperboard.

4. A device according to claim 2, wherein the outer surface of one or more of the first through fourth sections has visible graduations to indicate incremental quantities of the material held within the device.

5. A device according to claim 4 constructed of paperboard.

6. A device according to claim 1, wherein the first section has an easily creasable line dividing the first section into a first segment and a second segment, the tab being on the second segment such that the first segment can be folded with respect to the second segment about the creasable line with the first segment between the fourth section and the second segment when the tab is in the slot.

7. A device according to claim 6 constructed of paperboard.

8. A device according to claim 1 wherein one or both of the first edge of the first section and the second edge of the fourth section have a cutout portion to facilitate folding of the device to a substantially flat position with the first section inside surface in contact with the second section inside surface, the third section inside surface in contact with the fourth section inside surface and the first section outer surface in contact with the fourth section outer surface.

9. A device according to claim 8 constructed of paperboard.

10. A device according to claim 1 which, when folded for storage, has the outside of the first section in contact with the outside of the fourth section.

11. A device according to claim 10 constructed of paperboard.

12. A device according to claim 10 wherein the outside of the first segment of the first section is adhered to the outside of the fourth section so that the tab of the first section fits into the slot between the fourth and fifth sections when the device is folded for measuring.

13. A device according to claim 12 constructed of paperboard.

14. A device according to claim 1 without the options described in paragraphs (ii) and (iii) comprising a substantially flat member having first, second, third and fourth substantially triangular sections, each section having first, second, and third edges, the first and second edges of each section being substantially the same length, the first section second edge being connected at a fist crease along the second section first edge, the second section second edge being connected at a second crease along the third section first edge, the third section second edge being connected at a third crease along the fourth section first edge;
   wherein, when folded for measuring, the four sections are joined so that the first edge of the first section is affixed along the outside of the second edge of the third section and the fourth section is in contact with the inner surface of the first section.

15. A device according to claim 14 constructed of paperboard.

16. A device according to claim 14 which, when folded for storage, has the first and second outside segments of the first section in contact with one another.

17. A device according to claim 14 which, when folded for storage, has the first and second inside segments of the first section in contact with one another.

18. A device according to claim 1 constructed of paperboard, metal or a polymeric material.

19. A device according to claim 18 constructed of paperboard.

* * * * *